(12) United States Patent
Goda

(10) Patent No.: US 10,732,536 B2
(45) Date of Patent: Aug. 4, 2020

(54) INFORMATION PROCESSING APPARATUS AND IMAGE FORMING APPARATUS

(71) Applicant: CANON KABUSHIKI KAISHA, Tokyo (JP)

(72) Inventor: Junichi Goda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/561,849

(22) Filed: Sep. 5, 2019

(65) Prior Publication Data

US 2020/0081368 A1 Mar. 12, 2020

(30) Foreign Application Priority Data

Sep. 7, 2018 (JP) .................................. 2018-168253

(51) Int. Cl.
| | |
|---|---|
| *G03G 15/043* | (2006.01) |
| *G03G 15/04* | (2006.01) |
| *G03G 15/041* | (2006.01) |
| *G02B 26/12* | (2006.01) |

(52) U.S. Cl.
CPC ......... *G03G 15/043* (2013.01); *G02B 26/127* (2013.01); *G03G 15/0415* (2013.01); *G03G 15/04072* (2013.01); *G03G 15/0435* (2013.01)

(58) Field of Classification Search
CPC .............. G03G 15/04; G03G 15/043; G03G 15/04036; G03G 15/04045; G03G 15/04054; G03G 15/04072; H04N 1/113; H04N 1/1135; B41J 2/47; B41J 2/435; B41J 2/471; G02B 26/10; G02B 26/12; G02B 26/122; G02B 26/127
See application file for complete search history.

(56) References Cited

U.S. PATENT DOCUMENTS

| | | | |
|---|---|---|---|
| 9,575,314 B2 | 2/2017 | Araki | |
| 2008/0124125 A1* | 5/2008 | Hirano | G03G 15/326 399/151 |
| 2019/0243278 A1* | 8/2019 | Iikura | G02B 26/127 |
| 2019/0369519 A1* | 12/2019 | Obata | G03G 15/043 |
| 2020/0050128 A1* | 2/2020 | Goda | G03G 15/043 |

FOREIGN PATENT DOCUMENTS

JP 2011148142 A * 8/2011

* cited by examiner

*Primary Examiner* — Thomas S Giampaolo, II
(74) *Attorney, Agent, or Firm* — Venable LLP

(57) ABSTRACT

An information processing apparatus is configured to correctly detect a polygon face of a mirror being scanned even when noise occurs in a synchronization signal. The information processing apparatus is connected to an image forming apparatus including a laser light source configured to receive image data and output light; a photosensitive member; a polygon mirror, which has a plurality of reflection faces, and is configured to rotate to deflect a laser beam through use of the plurality of reflection faces, to thereby scan the photosensitive member; and a generator configured to generate a marking BD (beam detection) signal based on the deflected laser beam. The information processing apparatus receives a marking signal and determines whether or not the received marking signal is a signal corresponding to a specific reflection face among the reflection faces of the polygon mirror.

6 Claims, 8 Drawing Sheets

INFORMATION PROCESSING APPARATUS AND IMAGE FORMING APPARATUS

BACKGROUND OF THE INVENTION

Field of the Invention

The present disclosure relates to an information processing apparatus configured to correct image data to transmit the image data to an image forming apparatus, and to an image forming apparatus to which the information processing apparatus is connected.

Description of the Related Art

In an electrophotographic image forming apparatus using a laser or other such light source, a laser beam deflected by a rotating polygon mirror scans a photosensitive member, to thereby form an electrostatic latent image on the photosensitive member.

A shape of a face of the polygon mirror for deflecting the laser beam differs from one face to another. In a case where the shape of the face differs from one face to another, a latent image formed on an outer peripheral surface of a photosensitive drum by the laser beams deflected by the respective faces is disadvantageously deformed.

In U.S. Pat. No. 9,575,314 B2, there is described a configuration in which an image controller identifies a face of a polygon mirror on which a laser beam is deflected (the image controller performs face identification) based on a time interval between adjacent pulses of an input main-scanning synchronization signal. Specifically, the image controller performs processing involving measuring a time interval between adjacent pulses and identifying a face corresponding to each pulse based on a measurement result. The image controller performs, on the image data, correction corresponding to each face (correction of a writing start position of an image, for example). Image formation is performed based on the corrected image data.

In U.S. Pat. No. 9,575,314 B2, when noise occurs in the main-scanning synchronization signal or other such synchronization signals, the image controller fails to correctly detect a reflection face that is being currently scanned. When the reflection face that is being scanned cannot be correctly detected, it is not possible to perform, for example, corrections of an image output start position and a magnification corresponding to each reflection face, and thus it is not possible to generate an image having high accuracy. When the reflection face is not correctly detected due to the occurrence of noise, its influence also prevents the succeeding reflection face from being correctly detected.

Therefore, the present disclosure has an object to determine a reflection face with high accuracy.

SUMMARY OF THE INVENTION

An information processing apparatus is connected to an image forming apparatus including an image forming unit, which, according to the present disclosure, includes a first receiving unit configured to receive image data; a light source configured to output light based on the image data received by the first receiving unit; a photosensitive member; a rotary polygon mirror, which has a plurality of reflection faces, and is configured to rotate to deflect the light output from the light source through use of the plurality of reflection faces, to thereby scan the photosensitive member; a light receiving unit configured to receive the light deflected by the rotary polygon mirror; an identification unit configured to identify a reflection face that is used for scanning of the photosensitive member from among the plurality of reflection faces based on a result of the receiving of the light by the light receiving unit; and a generation unit configured to generate a predetermined signal including a signal having a first level and a signal having a second level, wherein the generation unit is configured to generate the predetermined signal based on information related to the reflection face identified by the identification unit such that a length of a first period differs from a length of a second period, the first period being a period in which the predetermined signal corresponding to a specific reflection face from among the plurality of reflection faces is at the first level, and the second period being a period in which the predetermined signal corresponding to a reflection face other than the specific reflection face is at the first level. The information processing apparatus comprises a second receiving unit configured to receive the predetermined signal; a first detector configured to detect a first change, in which a level of the predetermined signal received by the second receiving unit is changed from the second level to the first level; a second detector configured to detect a second change, in which the level of the predetermined signal received by the second receiving unit is changed from the first level to the second level; a determination unit configured to determine whether the first change is a change corresponding to the specific reflection face based on a detection result of both of the first detector and the second detector, wherein the determination unit updates, in a period from a first timing to a second timing, face information indicating one of the plurality of reflection faces each time the first change is detected by the first detector, the first timing being a timing at which the first change is determined to be the change corresponding to the specific reflection face, and the second timing is a timing at which the first change is determined, first after the first timing, to be the change corresponding to the specific reflection face; a correcting unit configured to correct, based on the face information, image data corresponding to a scanning line of the light, through use of correction data corresponding to the reflection face corresponding to the scanning line; and an output unit configured to output the corrected image data to the image forming unit in response to the first detector detecting the first change, wherein, in a case where the number of the first change detected by the first detector during a period from the first timing to the second timing exceeds the number corresponding to the number of the reflection faces of the rotary polygon mirror, the determination unit does not update the face information.

Further features of the present invention will become apparent from the following description of exemplary embodiments (with reference to the attached drawings).

DESCRIPTION OF THE EMBODIMENTS

In the following, at least one preferred embodiment of the present disclosure is described with reference to the drawings. However, shapes of components described in at least one embodiment, and their relative positions and the like are subject to appropriate change in accordance with a configuration and various conditions of an apparatus to which the present disclosure is applied. Accordingly, it is not intended to limit the scope of the present disclosure only to the following at least one embodiment.

Image Forming Operation

Figure 1:
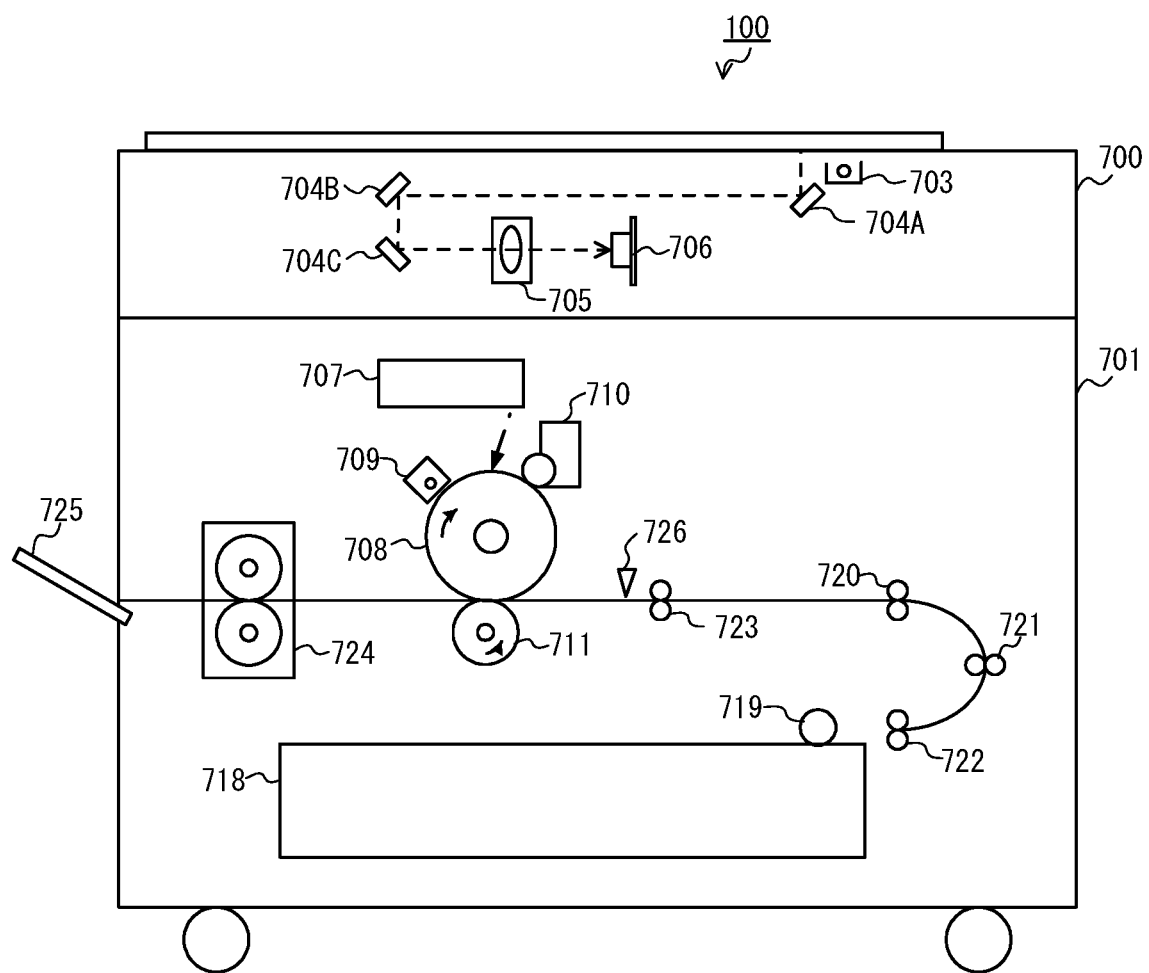
FIG. 1 is a sectional view for illustrating a configuration of an image forming apparatus according to at least one embodiment of the present disclosure.

FIG. 1 is a cross-sectional view for illustrating a configuration of a monochrome electrophotographic copying machine (hereinafter referred to as "image forming apparatus") 100. The image forming apparatus is not limited to a copying machine, and may also be, for example, a facsimile machine, a printing machine, or a printer. Further, the type of image forming apparatus may be any of a monochrome type and a color type.

With reference to FIG. 1, the configuration and functions of the image forming apparatus 100 are described. As illustrated in FIG. 1, the image forming apparatus 100 includes an image reading apparatus (hereinafter referred to as "reader") 700 and an image printing apparatus 701.

Light applied by an illumination lamp 703 at a reading position of the reader 700 and reflected from an original is guided to color sensors 706 by an optical system including reflection mirrors 704A, 704B, and 704C and a lens 705. The reader 700 reads the light that has entered the color sensors 706 for each of colors of blue (B), green (G), and red (R), and converts the read light into electrical image signals. The reader 700 further obtains image data by performing color conversion processing based on the strengths of the image signals of B, G, and R, and outputs the image data to an image controller 1007, which is described later with reference to FIG. 3.

A sheet receiving tray 718 is provided in the image printing apparatus 701. Each recording medium received in the sheet receiving tray 718 is fed by a sheet feeding roller 719, and is sent to registration rollers 723 in a stopped state by conveyance rollers 722, 721, and 720. A leading edge of the recording medium conveyed by the conveyance rollers 720 in a conveyance direction abuts against a nip portion of the registration rollers 723 in the stopped state. Then, when the conveyance rollers 720 further convey the recording medium under the state in which the leading edge of the recording medium abuts against the nip portion of the registration rollers 723 in the stopped state, the recording medium bends. As a result, an elastic force acts on the recording medium, and the leading edge of the recording medium abuts along the nip portion of the registration rollers 723. In the above-mentioned manner, skew feeding of the recording medium is corrected. After skew feeding of the recording medium is corrected, the registration rollers 723 start conveyance of the recording medium at timing described later. The term "recording medium" refers to a medium on which an image is to be formed by the image forming apparatus, and examples of the recording medium include a sheet of paper, a resin sheet, a piece of cloth, an OHP sheet, and a label.

The image data obtained by the reader 700 is corrected by the image controller 1007, and input to a laser scanner unit 707 including a laser and a polygon mirror. A photosensitive drum 708 has its outer peripheral surface charged with electricity by a charging device 709. After an outer peripheral surface of the photosensitive drum 708 is charged, a laser beam corresponding to the image data input to the laser scanner unit 707 is applied from the laser scanner unit 707 onto the outer peripheral surface of the photosensitive drum 708. As a result, an electrostatic latent image is formed on a photosensitive layer (photosensitive member) covering the outer peripheral surface of the photosensitive drum 708. A configuration for forming the electrostatic latent image on the photosensitive layer by the laser beam is described later.

Subsequently, the electrostatic latent image is developed by a toner contained in a developing device 710, and a toner image is formed on the outer peripheral surface of the photosensitive drum 708. The toner image formed on the photosensitive drum 708 is transferred onto the recording medium by a transfer charging device 711 arranged at a position (transfer position) opposed to the photosensitive drum 708. The registration rollers 723 send the recording medium to the transfer position at such timing as to enable the toner image to be transferred at a predetermined position of the recording medium.

In the above-mentioned manner, the recording medium on which the toner image has been transferred is fed to a fixing device 724, and is heated and pressurized by the fixing device 724. As a result, the toner image is fixed to the recording medium. The recording medium to which the toner image has been fixed is delivered to a delivery tray 725 provided outside the image forming apparatus 100.

In the above-mentioned manner, the image is formed on the recording medium by the image forming apparatus 100. The configuration and functions of the image forming apparatus 100 have been described above.

Configuration for Forming Electrostatic Latent Image

Figure 2:
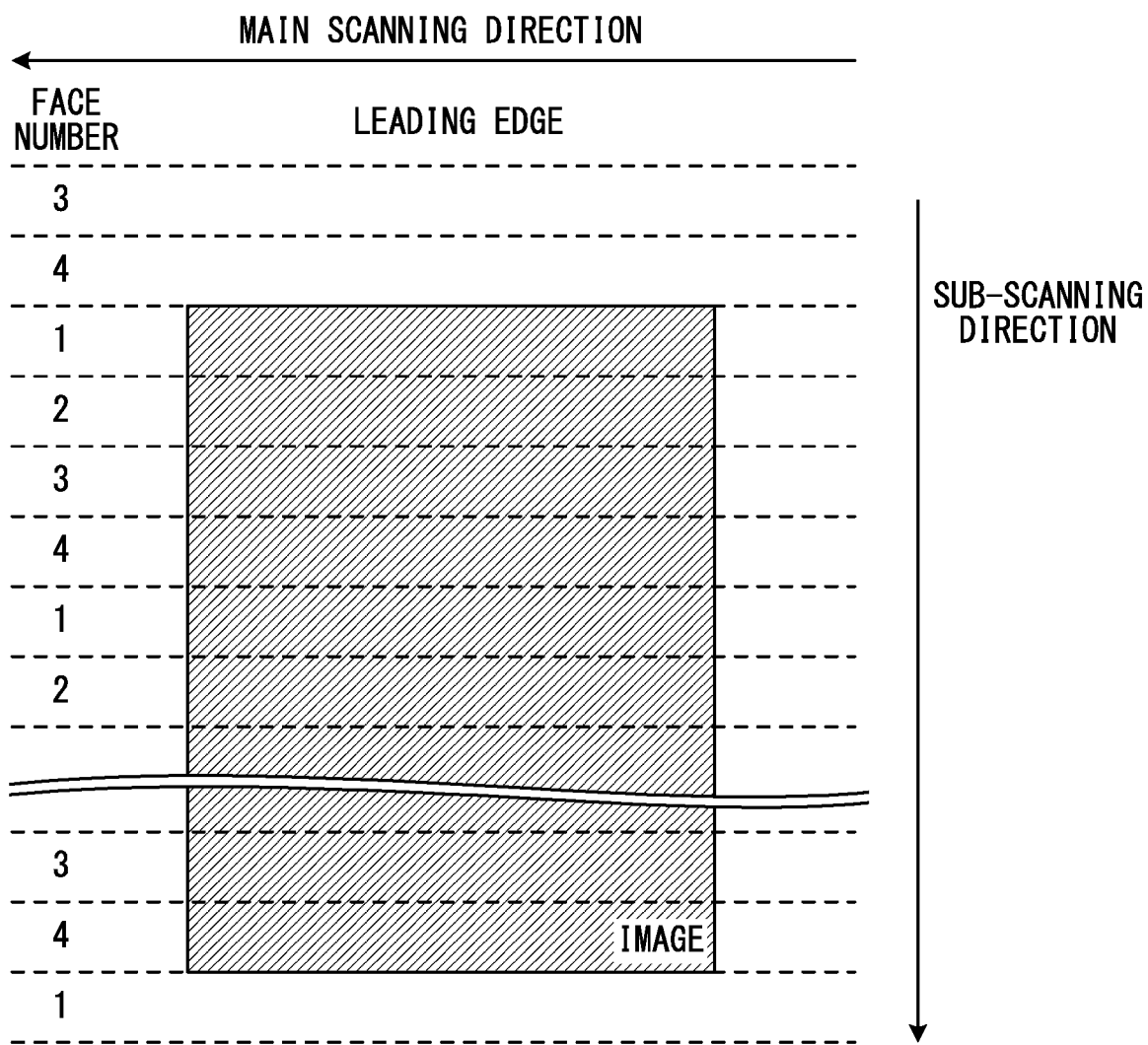
FIG. 2 is an explanatory diagram of an image corresponding to one surface of a recording medium.

FIG. 2 is an explanatory diagram of an image corresponding to one surface of the recording medium. A face number illustrated in FIG. 2 is a number indicating each of a plurality of reflection faces of a polygon mirror 1002. In at least one embodiment, the polygon mirror 1002 has four reflection faces. As illustrated in FIG. 2, a laser beam deflected by one reflection face from among the plurality of reflection faces of the polygon mirror 1002 scans the photosensitive layer in an axial direction of the photosensitive drum 708 (in a main scanning direction), to thereby form an image (electrostatic latent image) corresponding to a single time of scanning (corresponding to one line) on the photosensitive layer. The electrostatic latent image corresponding to one surface of the recording medium is formed on the photosensitive layer when scanning of the laser beam deflected by each face is repeatedly performed in a direction of rotation of the photosensitive drum 708 (in a sub-scanning direction).

In the following description, data on an image corresponding to the electrostatic latent image corresponding to one line is referred to as "image data".

Laser Scanner Unit

Figure 3:
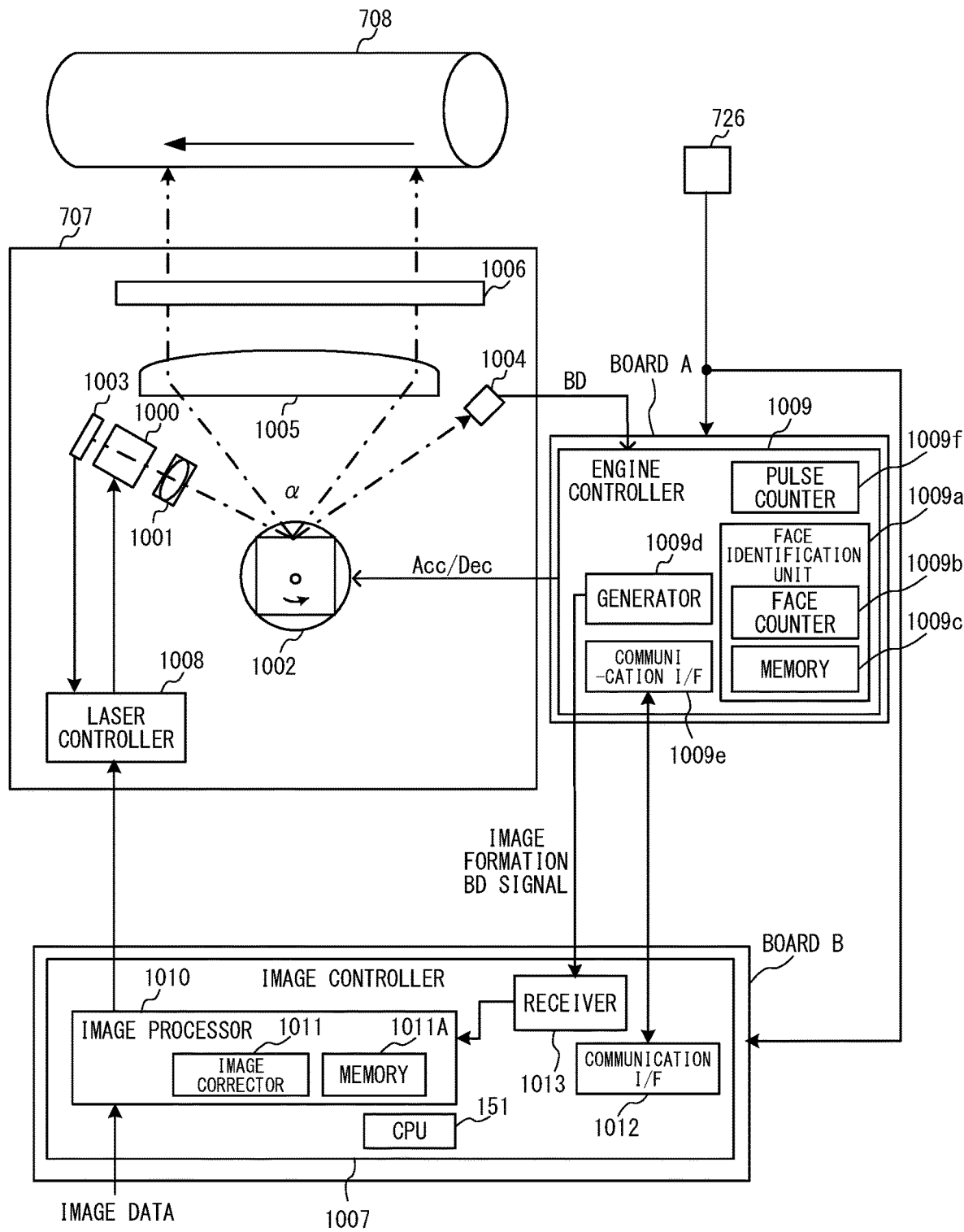
FIG. 3 is a block diagram for illustrating a configuration of a laser scanner unit.

FIG. 3 is a block diagram for illustrating a configuration of the laser scanner unit 707 in at least one embodiment. In the following, the configuration of the laser scanner unit 707 is described. In at least one embodiment, as illustrated in FIG. 3, a board A, on which an engine controller 1009 is mounted, is a board different from a board B, on which the image controller 1007 is mounted. The board A, on which the engine controller 1009 is mounted, is connected by a cable to the board B, on which the image controller 1007 is mounted. As another form, the board A and the board B may be integrated without being separately provided.

As illustrated in FIG. 3, laser beams are emitted from the both end portions of a laser light source 1000. The laser beam emitted from one end portion of the laser light source 1000 enters a photodiode 1003. The photodiode (PD) 1003 converts the incoming laser beam into an electrical signal, and outputs the electrical signal to the laser controller 1008 as a PD signal. The laser controller 1008 controls an output light amount of the laser light source 1000 (performs auto power control (APC)) based on the input PD signal so that the output light amount of the laser light source 1000 maintains a predetermined light amount.

Meanwhile, the laser beam emitted from another end portion of the laser light source 1000 is applied onto the polygon mirror 1002 serving as a rotary polygon mirror via a collimator lens 1001. The polygon mirror 1002 is rotationally driven by a polygon motor (not shown). The polygon motor is controlled by a drive signal (Acc/Dec) output from the engine controller 1009. The laser beam applied onto the polygon mirror 1002 being rotated is deflected by the polygon mirror 1002. The scanning of the outer peripheral surface of the photosensitive drum 708 by the laser beam changed by the polygon mirror 1002 is performed from the right side to the left side of FIG. 3.

The laser beam scanning the outer peripheral surface of the photosensitive drum 708 is corrected by an F-θ lens 1005 so as to scan the outer peripheral surface of the photosensitive drum 708 at a constant speed, and is applied onto the outer peripheral surface of the photosensitive drum 708 via a reflection mirror 1006.

Meanwhile, the laser beam deflected by the polygon mirror 1002 enters a beam detection (BD) sensor 1004 serving as a light receiver including a light receiving element configured to receive the laser beam. In at least one embodiment, the BD sensor 1004 is arranged at such a position as to cause the laser beam to be applied onto the outer peripheral surface of the photosensitive drum 708 after the BD sensor 1004 detects the laser beam, within a period from when the BD sensor 1004 detects the laser beam until the BD sensor 1004 detects the laser beam again. Specifically, for example, as illustrated in FIG. 3, the BD sensor 1004 is arranged in a region that is a part of a region through which the laser beam reflected by the polygon mirror 1002 passes, and that is outside a region indicated by an angle α and is located on an upstream side in a direction of scanning the laser beam.

The BD sensor 1004 generates a BD signal based on the detected laser beam, and outputs the BD signal to the engine controller 1009. The engine controller 1009 controls the polygon motor based on the input BD signal such that a rotation cycle of the polygon mirror 1002 reaches a predetermined cycle. When the cycle of the BD signal has reached a cycle corresponding to the predetermined cycle, the engine controller 1009 determines that the rotation cycle of the polygon mirror 1002 has reached the predetermined cycle.

The engine controller 1009 outputs an image formation BD signal to the image controller 1007 based on the input BD signal. The image formation BD signal is synchronized with the BD signal, and is generated by a generator 1009d by a method described later. The image formation BD signal corresponds to a signal indicating one scanning cycle at which the laser beam scans the photosensitive drum 708.

The image controller 1007 includes an image corrector 1011 and a memory 1011A, and outputs the corrected image data to the laser controller 1008 based on the image formation BD signal input to a receiver 1013. Specific control and configurations of the engine controller 1009 and the image controller 1007 are described later.

The laser controller 1008 causes the laser light source 1000 to emit light based on the input image data, to thereby generate a laser beam for forming an image on the outer peripheral surface of the photosensitive drum 708. In this manner, the laser controller 1008 is controlled by the image controller 1007 serving as an information processing apparatus. The generated laser beam is applied onto the outer peripheral surface of the photosensitive drum 708 by the above-mentioned method.

Assuming that a distance from a position at which the sheet sensor 726 detects the recording medium to the transfer position is set as a distance L, the distance L is longer than a distance x from a position on the outer peripheral surface of the photosensitive drum 708 at which the laser beam is applied to the transfer position in the rotation direction of the photosensitive drum 708. Specifically, the distance L is a distance obtained by adding the distance x to a distance for which the recording medium is conveyed during a period from when the sheet sensor 726 detects the leading edge of the recording medium until the laser beam is emitted from the laser light source 1000. During the period from when the sheet sensor 726 detects the leading edge of the recording medium until the laser beam is emitted from the laser light source 1000, the image controller 1007 corrects the image data, and the image controller 1007 controls the laser controller 1008, for example.

The configuration of the laser scanner unit 707 has been described above.

Method of Identifying Face of Polygon Mirror

The image controller 1007 corrects image data in accordance with the cycle of the input image formation BD signal, and outputs the corrected image data to the laser controller 1008 in order from the most upstream piece of image data in the sub-scanning direction. The laser controller 1008 controls the laser light source 1000 in accordance with the input image data, to thereby form an image on the outer peripheral surface of the photosensitive drum 708. In at least one embodiment, the number of faces of the polygon mirror 1002 is four, but the number of faces of the polygon mirror 1002 is not limited to four.

The image to be formed on the recording medium is formed by the laser beams deflected by the plurality of reflection faces of the polygon mirror 1002. Specifically, for example, as illustrated in FIG. 2, an image corresponding to the most upstream piece of image data in the sub-scanning direction is formed by a laser beam deflected by a first face of the polygon mirror 1002. Further, an image corresponding to the second most upstream piece of image data in the sub-scanning direction is formed by a laser beam deflected by a second face of the polygon mirror 1002, which is different from the first face. In the manner described above, the image formed on the recording medium is formed of images formed by the laser beams reflected by different reflection faces among the plurality of reflection faces of the polygon mirror 1002.

In a case where the polygon mirror having four reflection faces is used as the polygon mirror for deflecting the laser beam, there is a possibility that an angle formed by two adjacent reflection faces of the polygon mirror 1002 is not accurately 90°. Specifically, there is a possibility that, when the polygon mirror having four reflection faces is viewed from the direction of its rotation axis, an angle formed by two adjacent sides is not accurately 90° (that is, the shape of the polygon mirror viewed from the direction of the rotation axis is not a square). When the polygon mirror having n (n is a positive integer) reflection faces is used, there is a possibility that the shape of the polygon mirror viewed from the direction of the rotation axis is not a regular n-gon.

In a case in which the polygon mirror having four reflection faces is used, when the angle formed by two adjacent reflection faces of the polygon mirror is not accurately 90°, the position and size of the image formed by the laser beam differ from one reflection face to another. As a result, an image formed on the outer peripheral surface of the photosensitive drum 708 is deformed, and thus an image formed on the recording medium is also deformed.

In view of the above, in at least one embodiment, correction (correction of a writing start position of an image, for example) based on a correction amount (correction data) corresponding to each of the plurality of reflection faces of the polygon mirror 1002 is performed on the image data. In this case, a configuration for identifying a face on which the laser beam is deflected is required. In the following, an example of a method of identifying a reflection face on which the laser beam is deflected is described. In at least one embodiment, a face on which the laser beam is deflected (reflected) from among the plurality of reflection faces of the polygon mirror 1002 is identified by a face identification unit 1009a provided in the engine controller 1009.

Figure 4A:
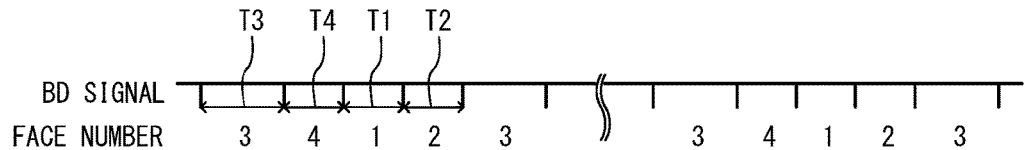
FIG. 4A and FIG. 4B are each a diagram for illustrating an example of a relationship between a BD signal and a face number.

FIG. 4A is a diagram for illustrating an example of a relationship between a BD signal generated by a laser beam scanning a light receiving surface of the BD sensor 1004 and a face on which the laser beam is deflected (face number thereof). As illustrated in FIG. 4A, a time period (scanning cycle) until a BD signal falls first after the BD signal rose subsequently to previous falling of the pulse of the BD signal differs from one face of the polygon mirror 1002 to another. The scanning cycle corresponds to a time period from when the laser beam scans the light receiving surface of the BD sensor 1004 until the laser beam scans the light receiving surface again for the first time after the laser beam scans the light receiving surface.

In FIG. 4A, a cycle corresponding to a face number 1 is indicated by T1, a cycle corresponding to a face number 2 is indicated by T2, a cycle corresponding to a face number 3 is indicated by T3, and a cycle corresponding to a face number 4 is indicated by T4. Each of the cycles is stored in a memory 1009c provided in the face identification unit 1009a.

Figure 4B:
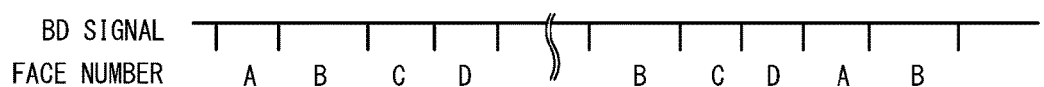

The face identification unit 1009a uses the following method to identify a face (face number) on which the laser beam is deflected. Specifically, as illustrated in FIG. 4B, the face identification unit 1009a sets face numbers A to D for four successive scanning cycles of the BD signal. Then, the face identification unit 1009a measures a scanning cycle for each of the face numbers A to D a plurality of times (for example, 32 times), and calculates an average value of the measured cycles for each of the face numbers A to D.

The engine controller 1009 identifies, based on the calculated cycle and the cycles T1 to T4 stored in the memory 1009c, which of the face numbers 1 to 4 each of the face numbers A to D corresponds to.

In the manner described above, the face identification unit 1009a identifies the number of a face on which the laser beam is deflected (reflection face that is used for scanning of the photosensitive drum 708 from among the plurality of reflection faces of the polygon mirror 1002) based on the input BD signal.

Engine Controller

Next, control to be performed by the engine controller 1009 in at least one embodiment is described with reference to FIG. 3 and FIG. 5.

As illustrated in FIG. 3, the face identification unit 1009a includes a face counter 1009b configured to store face information indicating a reflection face on which the laser beam for scanning the light receiving surface of the BD sensor 1004 is deflected from among the plurality of reflection faces.

Figure 5:
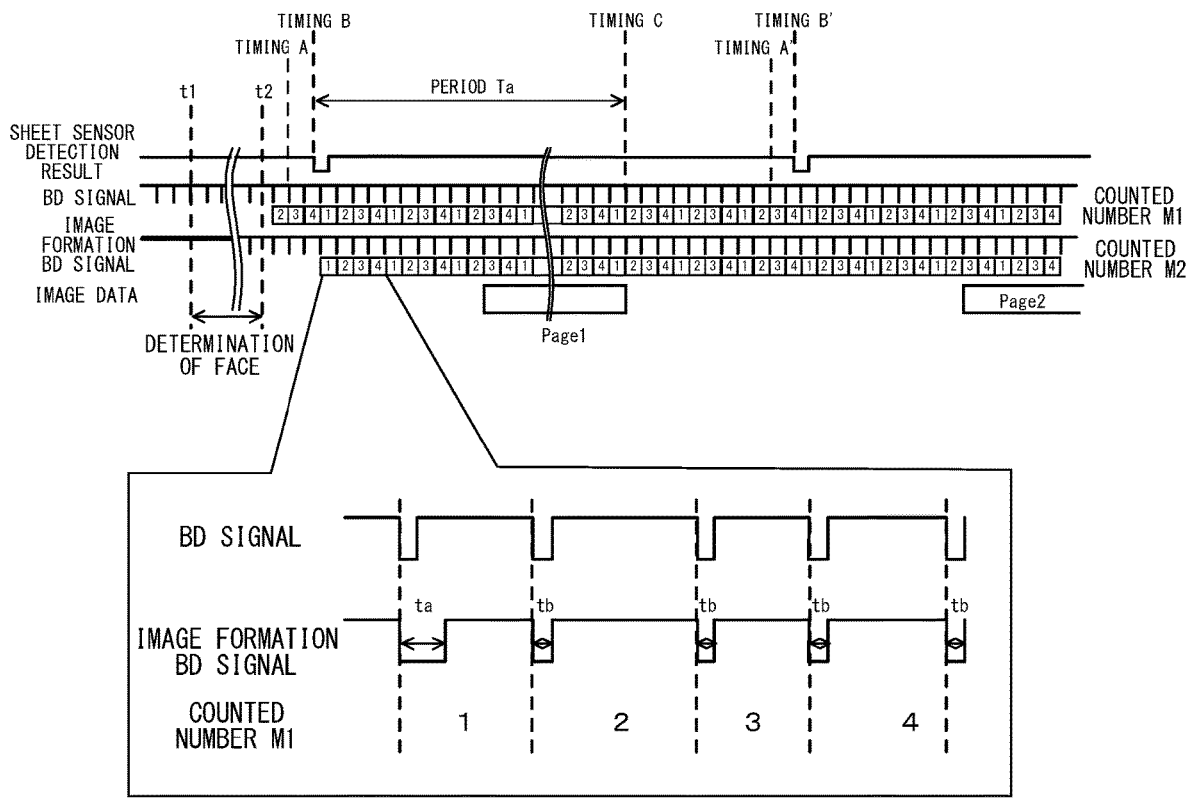
FIG. 5 is a timing chart for illustrating a relationship between different kinds of signals and a counted number of a face counter.

FIG. 5 is a timing chart for illustrating a relationship between different kinds of signals and a counted number M1 of the face counter 1009b. The counted number M1 of the face counter 1009b corresponds to the face information.

When the rotation cycle of the polygon mirror 1002 has reached the predetermined cycle (time t1), the engine controller 1009 (face identification unit 1009a) performs identification of a face number (determination of a face) by the method described above based on the input BD signal.

At a time t2, at which the face identification unit 1009a finishes the identification (estimation) of the face number, the engine controller 1009 starts counting by the face counter 1009b. Specifically, when the identification of the face number is finished, the engine controller 1009 sets a face number corresponding to a BD signal that is input first after the identification of the face number is finished, as an initial value of the counted number M1 of the face counter 1009b. After setting the initial value of the counted number M1, for example, the engine controller 1009 updates the counted number M1 every time a falling edge of the input BD signal is detected. When the polygon mirror 1002 has n (n is a positive integer) reflection faces, M1 is a positive integer satisfying $1 \leq M1 \leq n$.

The engine controller 1009 notifies the image controller 1007 via a communication I/F 1009e that the determination of the face is completed. In response to the above-mentioned notification, a central processing unit (CPU) 151 outputs an instruction to execute printing (instruction to form an image on the recording medium) (timing A). The above-mentioned output is performed via the communication I/F 1012, and the engine controller 1009 starts drive of the registration rollers 723. As a result, the leading edge of the recording medium is detected by the sheet sensor 726 (timing B). The timing A is determined by the CPU 151 based on a time period for processing of a print job input to the image forming apparatus 100. That is, the timing A is not limited to the timing illustrated in FIG. 5. Further, in at least one embodiment, the detection result illustrated in FIG. 5 reaching the low level corresponds to the sheet sensor 726 detecting the leading edge of the recording medium.

When the determination of the face is completed, a generator 1009d generates an image formation BD signal based on the face information on the reflection face identified by the face identification unit 1009a and the BD signal output from the BD sensor 1004. Specifically, the generator 1009d sets a time period in which an image formation BD signal indicating a specific reflection face (face "1" in at least one embodiment) is at "L (low level)" to a time period different from a time period in which an image formation BD signal indicating another reflection face is at "L (low level)". More specifically, as illustrated in FIG. 5, the generator 1009*d* sets a time period in which an image formation BD signal corresponding to the face number "1" is at "L" to a time period different from time periods for the other face numbers "2", "3", and "4". In at least one embodiment, a time period ta, in which the image formation BD signal corresponding to the face number "1" is at "L", is set to a time period longer than a time period in which the image formation BD signal corresponding to each of the other face numbers "2", "3", and "4" is at "L".

In response to (in synchronization with) the BD signal output from the BD sensor 1004, the engine controller 1009 outputs the signal generated by the generator 1009*d* as the image formation BD signal. The engine controller 1009 includes a pulse counter 1009*f* configured to count the number of pulses of the output image formation BD signal. Further, as illustrated in FIG. 3, a detection result obtained by the sheet sensor 726 is input to the engine controller 1009. The sheet sensor 726 is arranged on a downstream side of the registration rollers 723 in the conveyance direction of the recording medium, and is configured to detect that the leading edge of the recording medium has reached the sheet sensor 726. When a signal indicating that the sheet detection sensor 726 has detected the leading edge of the recording medium is input from the sheet sensor 726, the engine controller 1009 uses the pulse counter 1009*f* to start counting of the number of pulses of the output image formation BD signal. When the counted number of pulses has reached the number of pulses corresponding to one page of the recording medium (period Ta), the engine controller 1009 stops drive of the registration rollers 723.

Figure 6:
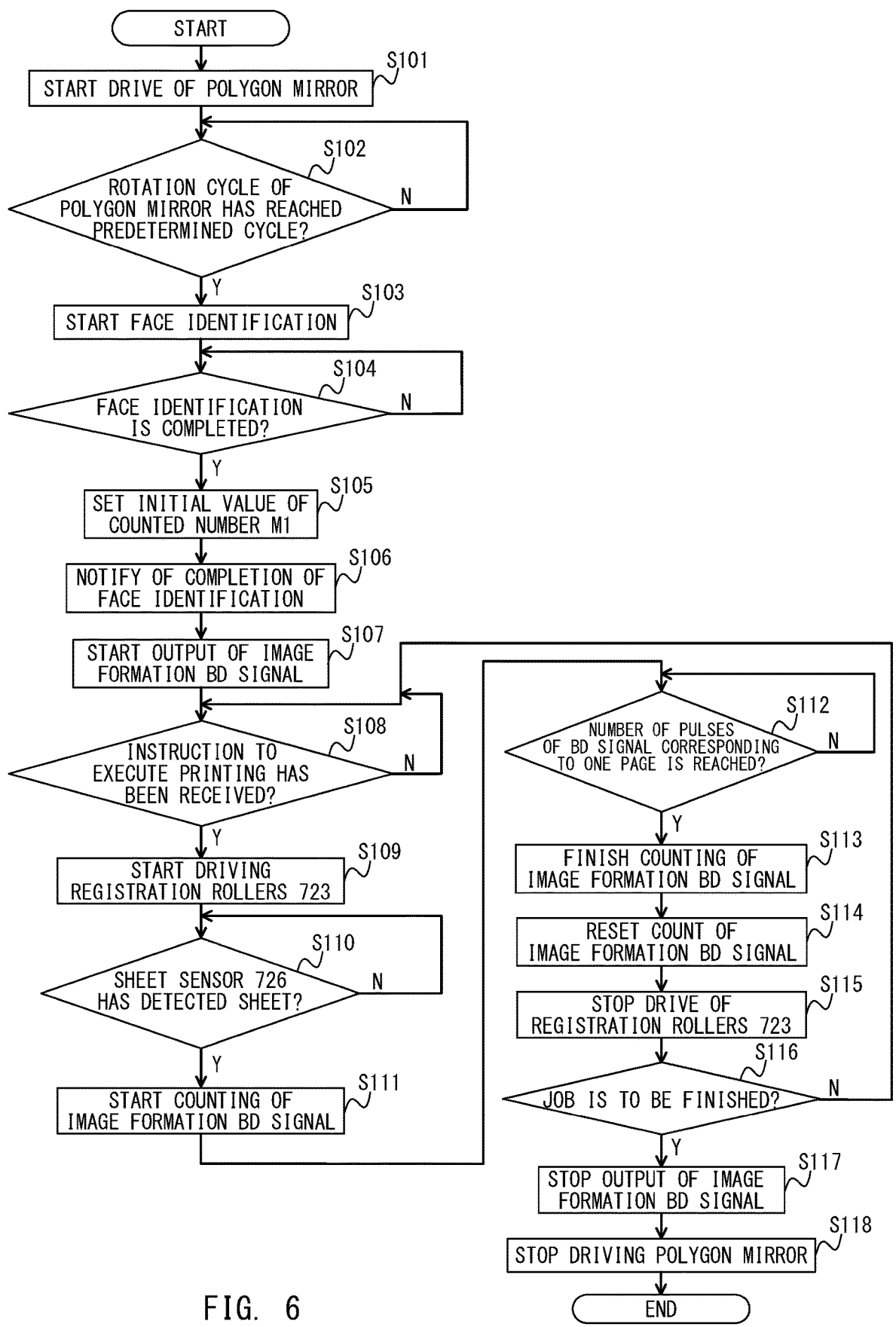
FIG. 6 is a flow chart for illustrating control to be performed by an engine controller.

FIG. 6 is a flow chart for illustrating control to be performed by the engine controller 1009 in at least one embodiment. The processing of the flow chart illustrated in FIG. 6 is executed by the engine controller 1009. In the following description, after the face identification is completed, the engine controller 1009 updates the counted number M1 every time the falling edge of the input BD signal is detected.

When the printing job is started, in Step S101, the engine controller 1009 starts drive of the motor (polygon motor) configured to rotationally drive the polygon mirror 1002.

In Step S102, the engine controller 1009 determines whether or not the rotation cycle of the polygon mirror 1002 has reached the predetermined cycle, and when the predetermined cycle has not been reached (Step S102: N), executes Step S102 again. When the predetermined cycle has been reached (Step S102: Y), in Step S103, the engine controller 1009 starts face identification (time t1). Then, in Step S104, the engine controller 1009 determines whether or not the engine controller 1009 completes the face identification. When the face identification is not completed (Step S104: N), the engine controller 1009 executes Step S104 again. When the face identification is completed (Step S104: Y; time t2), the processing proceeds to Step S105.

Then, in Step S105, the engine controller 1009 sets a face number corresponding to a BD signal that is input first after the identification of the face number is finished, as an initial value of the counted number M1 of the face counter 1009*b*. When the initial value is set, the engine controller 1009 updates the counted number M1 every time the falling edge of the input BD signal is detected.

Subsequently, in Step S106, the engine controller 1009 notifies the image controller 1007 via the communication I/F 1009*e* that the face identification is completed. Then, in Step S107, the engine controller 1009 starts output of the image formation BD signal.

In Step S108, the engine controller 1009 determines whether or not the instruction to form an image on the recording medium has been received from the CPU 151, and when the instruction has not been received (Step S108: N), executes Step S108 again. When the instruction has been received (Step S108: Y), in Step S109, the engine controller 1009 starts drive of the registration rollers 723. As a result, the conveyance of the recording medium is started.

After that, in Step S110, the engine controller 1009 determines whether or not a signal indicating that the sheet sensor 726 has detected the leading edge of the recording medium is input to the engine controller 1009, and when the signal is not input (Step S110: N), executes Step S110 again. When the signal is input (Step S110: Y), in Step S111, the engine controller 1009 starts counting of the pulse of the output image formation BD signal. The engine controller 1009 counts, for example, falling of the pulse of the output image formation BD signal.

In Step S112, the engine controller 1009 determines whether or not the counted number of pulses has reached the number of pulses corresponding to one page of the recording medium (period Ta), and when the counted number of pulses has not reached the number of pulses corresponding to one page (Step S112: N), executes Step S112 again. When the counted number of pulses has reached the number of pulses corresponding to one page (Step S112: Y), in Step S113, the engine controller 1009 finishes counting of the pulses of the output image formation BD signal, and in Step S114, resets the counted number.

Further, in Step S115, the engine controller 1009 stops drive of the registration rollers 723.

Subsequently, in Step S116, the engine controller 1009 determines whether or not a print job has been finished, and when the print job has not been finished (Step S116: N), the processing returns to Step S108 again.

Further, in Step S116, when the printing job is finished (Step S116: Y), the engine controller 1009 stops output of the image formation BD signal in Step S117, stops driving the polygon mirror 1002 in Step S118, and ends the processing of the flow chart. The control to be performed by the engine controller 1009 has been described above.

Image Formation BD Signal

Now, the image formation BD signal to be generated by the engine controller 1009 in at least one embodiment is described in more detail.

In regard to the image formation BD signal, in order to notify the image controller 1007 whether or not a specific reflection face of the polygon mirror 1002 is being scanned, an image formation BD signal having a long assertion period for a specific reflection face among the reflection faces of the polygon mirror 1002 is generated. The "assertion period" refers to a certain period during which the BD signal has a value of Low. The image formation BD signal having a long assertion period corresponding to the specific reflection face is referred to as "marking BD signal".

The image controller 1007 detects whether or not the image formation BD signal is a marking BD signal to determine which polygon face of the polygon mirror 1002 is being scanned. The image controller 1007 performs fine adjustment of a writing start position in the main scanning direction based on the polygon face being scanned and fine magnification varying processing corresponding to the polygon face, and outputs the image data as the drive signal for the laser controller 1008.

Timing Chart

Figure 7:
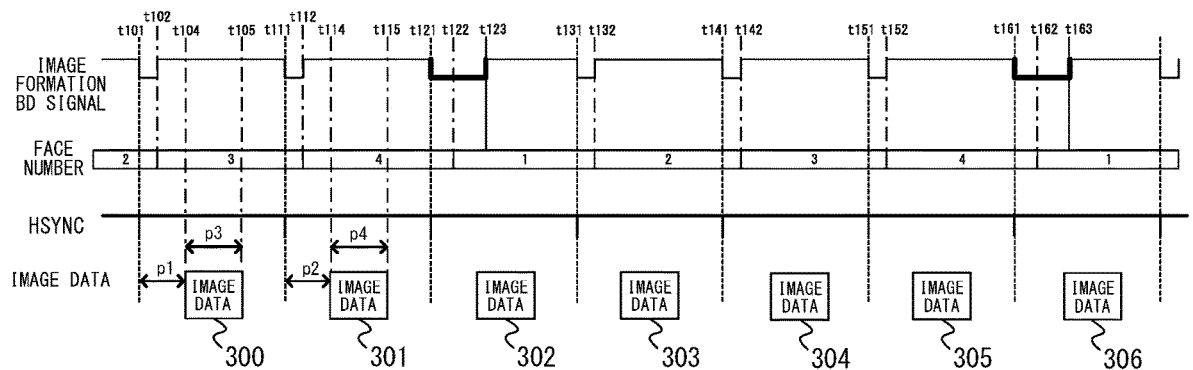
FIG. 7 is a timing chart for illustrating a BD signal and image data.

FIG. 7 is a diagram for illustrating a timing chart of the image formation BD signal between the engine controller 1009 and the image controller 1007 and the image data output from the image controller 1007 through the laser controller 1008.

The image formation BD signal is a signal generated by the engine controller 1009 and received by the image controller 1007. The face number is information indicating which face of the polygon mirror 1002 is being scanned, and is generated by the image controller 1007. "HSYNC" is a synchronization signal for outputting the image data, and corresponds to a falling edge of the image formation BD signal. The image data is a signal generated and output by the image controller 1007.

The above-mentioned marking BD signal is an image formation BD signal asserted at t121 and deasserted at t123, and asserted at t161 and deasserted at t163. In this example, the polygon mirror 1002 has four faces. Therefore, in order to notify the image controller 1007 that the specific reflection face is scanned once every four times, the assertion period of the marking BD signal is set longer than the assertion period of any other image formation BD signal. In this example, the number of the polygon face corresponding to the marking BD signal is the face number 1, and hence the first face of the polygon mirror 1002 is the specific reflection face.

It suffices that the assertion period of each image formation BD signal other than the marking BD signal is a period distinguishable from the assertion period of a marking signal. In at least one embodiment, the assertion periods of the image formation BD signals other than the marking BD signal are equal to one another, but are not always required to be set equal to one another as long as the assertion periods of the image formation BD signals are distinguishable from the assertion period of the marking signal.

In at least one embodiment, assertion intervals of the image formation BD signals are set to be the same interval, although there may be a minor error. The assertion intervals of the image formation BD signals are an interval from t101 to t111, an interval from t111 to t121, an interval from t121 to t131, and other such intervals between falling edge timings of the image formation BD signals. Those intervals are hereinafter referred to as "BD cycle".

The image controller 1007 detects which face of the polygon mirror 1002 is being scanned based on the marking BD signal to generate the face number. In addition, the image controller 1007 performs adjustment of the writing start position in the main scanning direction and the fine magnification varying processing on the image data corresponding to the face number.

Image data 300 is subjected to adjustment for an ideal output start position corresponding to the face number 3 and ideal fine magnification varying, and image data 301 is subjected to adjustment for an ideal output start position corresponding to the face number 4 and ideal fine magnification varying. Therefore, periods p1 and p2 are slightly different from each other, and periods p3 and p4 being output periods of the image data 300 and the image data 301 are also slightly different from each other. The same applies to the other face numbers.

In the following, a method of accurately correcting the face number even when noise interferes with the image formation BD signal in at least one embodiment is described.

Configuration of Image Controller

Figure 8:
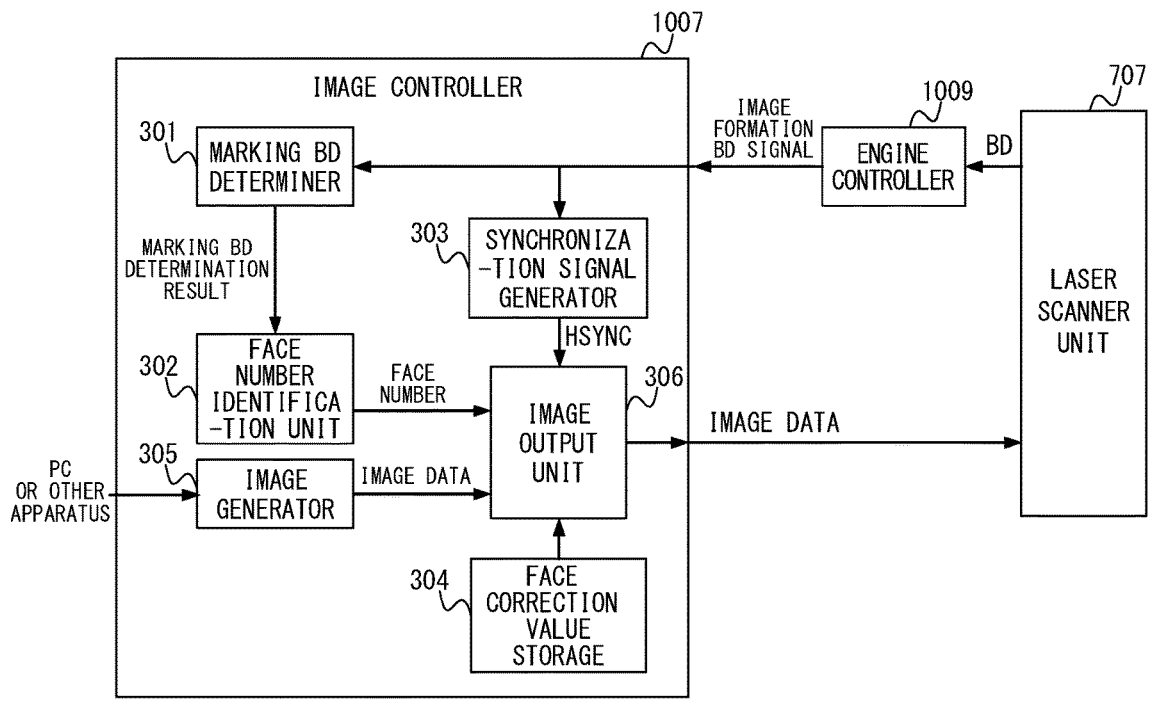
FIG. 8 is an explanatory diagram of a configuration of an image controller.

FIG. 8 is a diagram of a configuration of the image controller 1007. Unless otherwise stated, each of a marking BD determiner 301, a face number identification unit 302 serving as a face identification unit, and other such components of the image controller 1007 execute the following processing under the control of the CPU 151 of the image controller 1007.

The marking BD determiner 301 determines whether the assertion period of the image formation BD signal input from the laser scanner unit 707 through the engine controller 1009 is shorter than a predetermined time period, or equal to or longer than the predetermined time period. The marking BD determiner 301 determines, from a result of the determination, whether or not the image formation BD signal is a marking BD signal. The determination result is output to the face number identification unit 302 as a result of marking BD determination. The above-mentioned predetermined time period is a time period longer than a time period from t101 to t102 and shorter than a time period from t121 to t123 in the timing chart of FIG. 7.

The face number identification unit 302 identifies a face number based on the result of the marking BD determination, which is input from the marking BD determiner 301, and outputs the face number to an image output unit 306. The processing flow of the face number identification unit 302 is described with reference to FIG. 9.

A synchronization signal generator 303 applies noise masking for a period shorter than the BD cycle from the falling edge of the input image formation BD signal. Specifically, the falling edge of the image formation BD signal is controlled so as not to be detected. The synchronization signal generator 303 applies the noise masking, to thereby generate an HSYNC signal to be used by the image output unit 306 as the synchronization signal for outputting the image, and outputs the HSYNC signal to the image output unit 306.

A face correction value storage 304 stores an ideal writing start position in the main scanning direction and an ideal magnification ratio for each of the faces of the polygon mirror 1002.

An image generator 305 generates an image to be output from the image forming apparatus 100. For example, the image generator 305 performs optimal image processing on the image received from a PC or other such external host apparatus or a scanner apparatus, and converts the image into halftone data that can be printed by the image forming apparatus 100, to thereby generate an output image. The image generator 305 outputs the generated image data to the image output unit 306.

In synchronization with the input HSYNC signal, the image output unit 306 outputs the image data received from the image generator 305 to the laser scanner unit 707 in accordance with the face number received from the face number identification unit 302. At this time, an ideal correction value for each polygon face, which is input from the face correction value storage 304, is used to correct the received image data.

Flow Chart of Face Number Identification Unit

Figure 9:
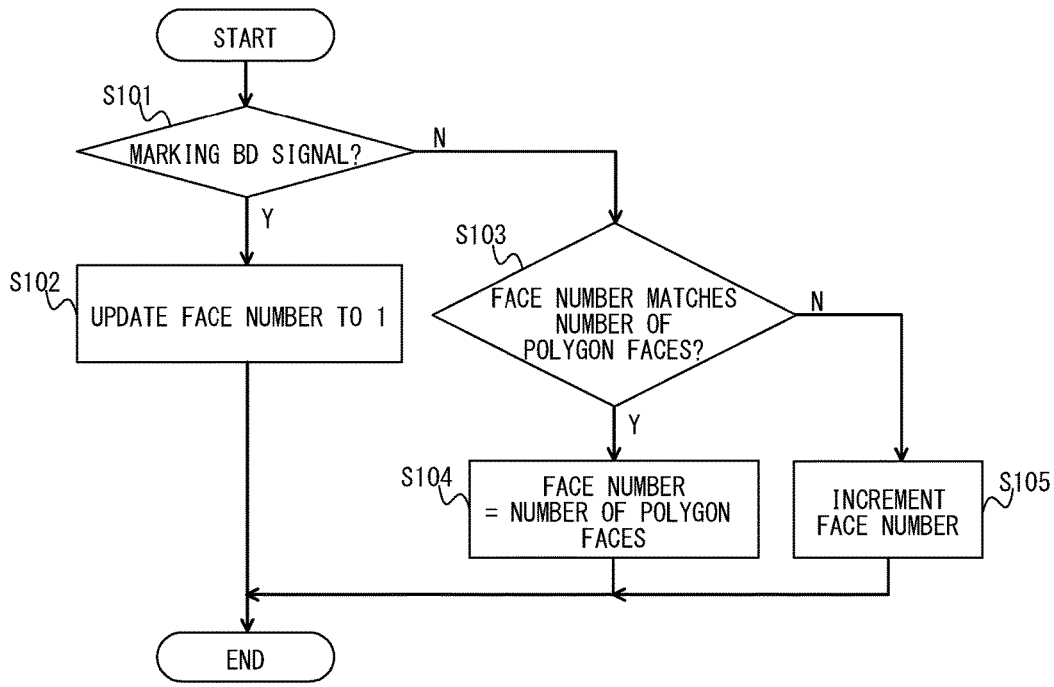
FIG. 9 is a flow chart for illustrating processing for identifying a face number.

FIG. 9 is a flow chart for illustrating processing for identifying the face number, which is to be executed by the face number identification unit 302. The face number identification unit 302 identifies the face number of the reflection face reflecting the laser beam based on the determination result input from the marking BD determiner 301, and outputs the identified face number to the image output unit 306 while recording the identified face number in the memory 1011A.

In the following, the processing for identifying the face number of the reflection face is described. The marking BD determiner 301 determines whether or not the input image formation BD signal is a marking BD signal (Step S101), and transmits the determination result to the face number identification unit 302. When the input image formation BD signal is a marking BD signal (Step S101: Y), the face number identification unit 302 determines that the reflection face reflecting the laser beam is the first face, updates the face number recorded in the memory 1011A to 1, and outputs the updated face number (Step S102).

When the input image formation BD signal is not a marking BD signal (Step S101: N), the face number identification unit 302 determines whether or not the face number of the reflection face identified last time is the face number of the reflection face scanned by the laser beam before the first face corresponding to the marking BD signal. To that end, the face number identification unit 302 reads the face number recorded in the memory 1011A.

In at least one embodiment, the first face corresponds to the marking BD signal, and the face scanned by the laser beam before the first face is the fourth face, that is, the face having the same face number as the number of faces of the polygon. Therefore, in at least one embodiment, the face number identification unit 302 determines whether or not the face number read from the memory 1011A matches 4 being the number of polygon faces of the polygon mirror 1002 (Step S103). When the face number recorded in the memory 1011A is 4, the face number identification unit 302 determines that the face number "matches" the number of polygon faces, and otherwise determines that the face number "does not match" the number of polygon faces.

When determining that the face number recorded in the memory 1011A matches 4 being the number of polygon faces (Step S103: Y), the face number identification unit 302 maintains the face number recorded in the memory 1011A at 4, and outputs "4" as the face number (Step S104). When the face number recorded in the memory 1011A does not match 4 (Step S103: N), the face number identification unit 302 updates the face number recorded in the memory 1011A by adding 1 thereto, to thereby perform increment processing (Step S105). The incremented value is output as the face number. For example, when the face number recorded in the memory 1011A is 1, the face number is incremented to 2 to be output, and when the face number recorded in the memory 1011A is 2, the face number is incremented to 3 to be output.

Timing Chart Obtained when Face Number Correction is Performed

Figure 10:
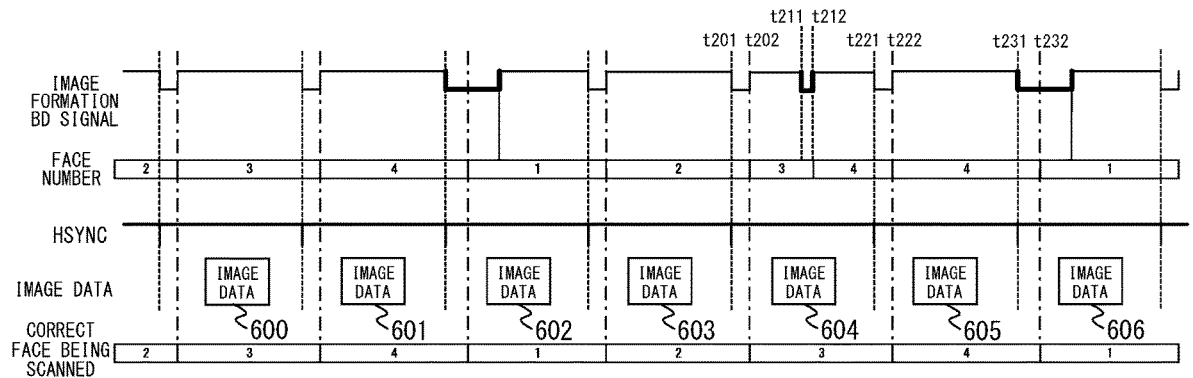
FIG. 10 is a timing chart for illustrating a correction of the face number, which is to be performed when noise interferes with an image formation BD signal.

FIG. 10 is a timing chart for illustrating correction of the face number, which is to be performed when noise occurs in the image formation BD signal. This timing chart is a timing chart achieved by using the configuration of the image controller 1007 and the face number identification unit 302, which are illustrated in FIG. 8 and FIG. 9.

In FIG. 10, in the BD cycle of the image formation BD signal between t201 and t221, the image formation BD signal is asserted at t211, which is a timing at which the image formation BD signal is not to be originally asserted, and is deasserted at t212. In short, t211 and t212 are the falling and the rising of the image formation BD signal due to noise.

The marking BD determiner 301 determines whether the assertion period of the image formation BD signal from t211 to t212 is shorter than the above-mentioned predetermined time period, or equal to or longer than the predetermined time period. The assertion period of the image formation BD signal from t211 to t212 is determined to be shorter than the predetermined time period, and the face number identification unit 302 is notified of the determination result. The face number identification unit 302 determines from the determination result that a portion from the falling at t211 to the rising at t212 is not a marking BD signal (Step S101: N). As illustrated in FIG. 10, the face number recorded in the memory 1011A is 3 during the period from t211 to t212, and hence the face number identification unit 302 determines that the face number does not match 4 being the number of polygon faces (Step S103: N). The face number identification unit 302 proceeds to Step S105 in accordance with the flow illustrated in FIG. 9 at the timing of t212, and increments the face number recorded in the memory 1011A to obtain the face number being 4 (Step S105).

At the timing of t211, the HSYNC signal is not asserted. The reason is that a time period between the falling edge of the image formation BD signal detected at the timing of t201 and t221 being the end of the period shorter than the BD cycle is subjected to the mask processing for the falling edge of the image formation BD signal by the synchronization signal generator 303.

Subsequently, the marking BD determiner 301 determines the assertion period of the image formation BD signal from t221 to t222 (Step S101). This assertion period is shorter than the above-mentioned predetermined time period, and the face number identification unit 302 is notified of the determination result. The face number identification unit 302 determines from the determination result that the image formation BD signal from t221 to t222 is not a marking BD signal (Step S101: N). The face number identification unit 302 proceeds to Step S104 in accordance with the flow illustrated in FIG. 9 at the timing of t222, and maintains the face number recorded in the memory 1011A at the number of polygon faces being 4 (Step S104), while maintaining the face number to be output to the image output unit 306 at 4 as well.

The marking BD determiner 301 determines the length of the assertion period of the image formation BD signal from t231 to t232. This assertion period is equal to or longer than the above-mentioned predetermined time period, and the face number identification unit 302 is notified of the determination result. The face number identification unit 302 determines from the determination result that the image formation BD signal from t231 to t232 is a marking BD signal (Step S101: Y), and at the timing of t232, updates the face number recorded in the memory 1011A to 1 (Step S102).

As illustrated in FIG. 10, in at least one embodiment, during the period from t212 to t222, the face number is determined to be 4 even when the face of the polygon mirror 1002 being scanned is 3 in actuality. The face number is ideally to be set to 3 during the period from t202 to t222, during which image data 604 is being output, but in at least one embodiment, the correct face number can be restored at a time point at which the marking BD signal is input, that is, the timing of t232 in FIG. 10.

At the timing of t222, when determining that the image formation BD signal is not a marking BD signal and the face number is equal to the number of polygon faces, the face number identification unit 302 maintains the face number at the number of polygon faces. Therefore, when the last face (in at least one embodiment, the fourth face) of the polygon mirror 1002 is being actually scanned, the face number can be caused to match the correct face number. Specifically, in regard to the fourth face being the face scanned by the laser beam before the face (in at least one embodiment, the first face) corresponding to the marking BD signal, the face number identification unit 302 can cause the face number to match the correct face number by maintaining the face number as in Step S103 and Step S104.

Even when noise interferes with the image formation BD signal, the above-mentioned control allows the face number to be set to the number corresponding to the marking BD signal when the input image formation BD signal is a marking BD signal (Step S101: Y). As a result, the face number can be corrected to the correct face number without fail until the polygon mirror has been rotated by one revolution.

Meanwhile, when the input image formation BD signal is not a marking BD signal, the face number obtained when the last face of the polygon mirror is being actually scanned also matches the last face by performing the processing of Step S103 and Step S104, and hence it is possible to alleviate a shift in face number.

This is based on the fact that, when noise interferes with the image formation BD signal, in most cases, the face of the polygon mirror 1002 being scanned by the laser beam is determined to have been moved on to the next reflection face of the polygon mirror 1002, and hence the determined face number is larger than the actual face number. As illustrated in Step S101, Step S103, and Step S105, the face number is incremented when the input image formation BD signal is not a marking BD signal and the face number does not match the number of polygon faces. Therefore, when noise interferes with the image formation BD signal, the face number is determined to have reached the last face before the laser beam actually scans the last face of the polygon mirror 1002. In addition, in Step S103, when the face number is the last face, the face number is maintained at 4 being the face number of the last face without updating the face number to 1. Therefore, when the last face of the polygon mirror 1002 is being actually operated, the face number is determined to be the number of the last face.

At least one embodiment has been described by taking the case in which the polygon mirror 1002 has four faces, but this configuration can be further generalized by setting the number of faces of the polygon mirror 1002 to N (where N represents a natural number equal to or larger than 3). In this case, 1 is assigned as the face number of the face corresponding to the marking BD signal, to thereby obtain N as the face number of the face scanned by the laser beam before the face corresponding to the marking BD signal. In an actual case, the first face to the N-th face may be assigned for the polygon mirror 1002 in advance, and the marking BD signal may be assigned to a face other than the first face. The present disclosure can also be applied to such a case by renumbering the face numbers by setting the face to which the marking BD signal is assigned as the first face.

Output Timing of Image Data

Next, an output timing of the image data after the face is determined as described above is described. The image processor 1010 outputs corrected image data based on the image formation BD signal input from the engine controller 1009 to the image controller 1007. Specifically, when "y" image formation BD signals (in at least one embodiment, 10 signals) have been input since the signal indicating detection of the leading edge of the recording medium was output from the sheet sensor 726 (that is, from 11th pulse), the image processor 1007 starts output of the corrected image data.

As described above, in at least one embodiment, when ten pulses of the image formation BD signal have been output since the sheet sensor 726 detected the leading edge of the recording medium, the corrected image data is started to be output. As a result, the image is formed at a predetermined position of the recording medium.

Correction of Image Data

The image corrector 1011 serving as a correction unit corrects image data in order from image data A, which is the most upstream piece of image data in the sub-scanning direction from among a plurality of pieces of data forming the image corresponding to one page, which is described with reference to FIG. 2. Specifically, for example, when an image corresponding to the image data A is an image formed by the laser beam deflected by the reflection face corresponding to the face number "1", the image corrector 1011 performs correction corresponding to the face number "1" on the image data A. More specifically, the image corrector 1011 reads out from the memory 1011A correction data corresponding to the face number "1". Then, the image corrector 1011 corrects the image data A based on the read correction data. After that, the image corrector 1011 corrects the most upstream piece of image data B from among a plurality of pieces of image data on the downstream side of the image data A in the sub-scanning direction, based on correction data corresponding to the face number "2" stored in the memory 1011A. As described above, in the memory 1011A, the correction data corresponding to each face number is stored in association with the face number.

With this configuration, a laser beam based on image data corrected through use of correction data corresponding to a face number "m" (m is a positive integer of from 1 to 4) is deflected by a reflection face corresponding to the face number "m". The image corrector 1011 performs the above-mentioned processing until correction of image data corresponding to one surface of the recording medium is completed.

The image corrector 1011 outputs to the laser controller 1008 the image data that has been corrected in the above-mentioned manner for each region in order from the downstream side (that is, from the image data A). Every time the falling edge of the image formation BD signal is detected (that is, in accordance with the cycle of the image formation BD signal), the image corrector 1011 outputs one piece of image data to the laser controller 1008. In at least one embodiment, the image corrector 1011 corrects the image data and outputs the corrected image data in synchronization with the image formation BD signal, but the present disclosure is not limited thereto. For example, the image corrector 1011 may be configured to correct image data in advance based on the counted number M2, and output the image data corrected in advance to the laser controller 1008 in synchronization with the image formation BD signal.

The image corrector 1011 has built therein a counter (not shown) configured to count the number of pieces of output image data. When the counted number of the counter reaches a value corresponding to one sheet (corresponding to one page) of the recording medium, the image corrector 101 stops output of the image data.

Figure 11:
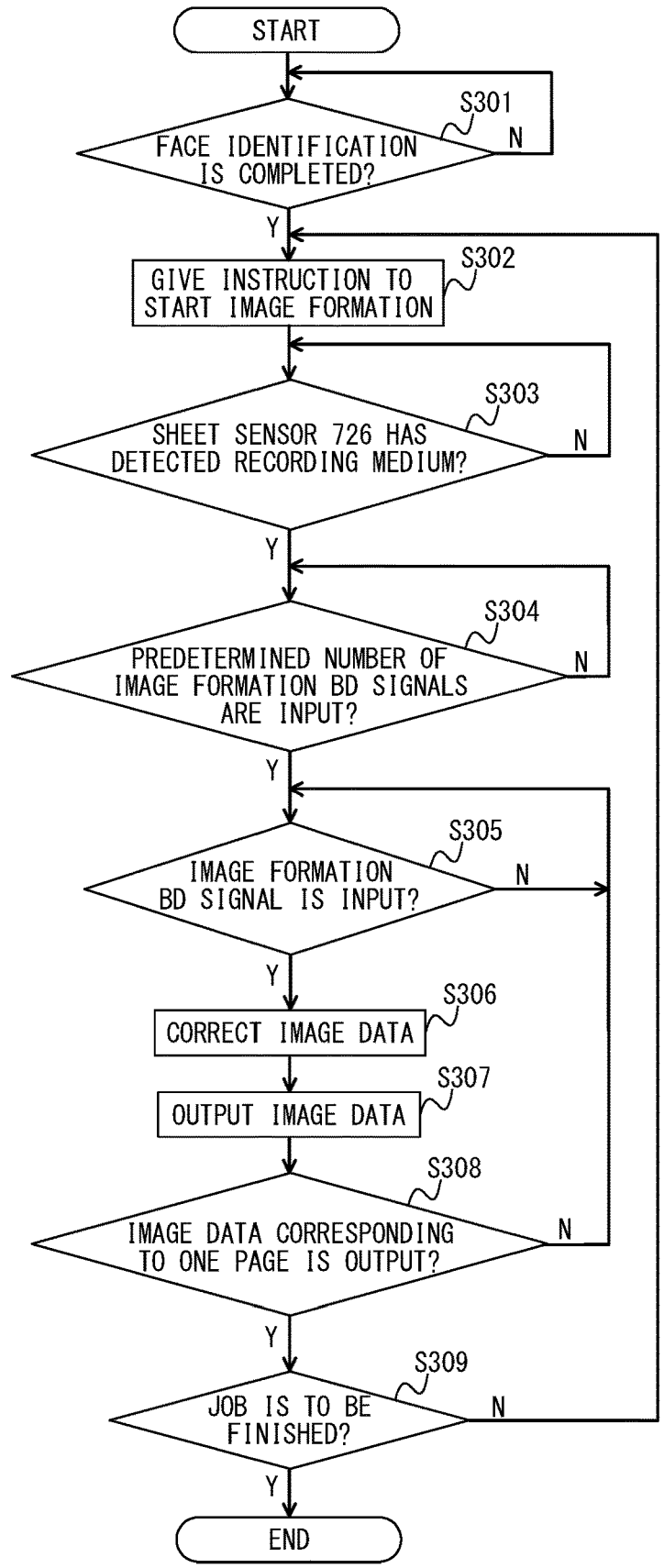
FIG. 11 is a flow chart for illustrating control to be performed by the image controller.

FIG. 11 is a flow chart for illustrating control to be performed by the image controller 1007. The processing of the flow chart illustrated in FIG. 11 is executed by the CPU 151. In the following description, the face number to be output from the face counter 1009b to the image corrector 1011 is updated every time the counted number M2 is updated. Further, during a period in which the processing of the flow chart illustrated in FIG. 11 is executed, the image controller 1007 counts the number of regions of the output image data.

In Step S301, when being notified that the face identification is completed from the engine controller 1009 via the communication I/F 1012, in Step S302, the CPU 151 outputs to the engine controller 1009 an instruction to form an image on the recording medium. As a result, the engine controller 1009 starts drive of the registration rollers 723.

After that, in Step S303, when the signal indicating that the sheet sensor 726 has detected the leading edge of the recording medium is input to the image controller 1007, the CPU 151 advances the processing to Step S304.

In Step S304, when a predetermined number of image formation BD signals (ten image formation BD signals in at least one embodiment) have been input (when the falling edge of the image formation BD signal has been detected a predetermined number of times), the processing proceeds to Step S305.

In Step S305, when the next image formation BD signal (11th image formation BD signal in at least one embodiment) has been input, in Step S306, the CPU 151 controls the image corrector 1011 such that the image corrector 1011 corrects the image data based on the face number indicated by the counted number M2. As a result, the image corrector 1011 corrects the image data based on the face number indicated by the counted number M2.

Then, in Step 307, the CPU 151 controls the image corrector 1011 such that the image corrector 1011 outputs the image data corrected in Step S306 to the laser controller 1008 in synchronization with the image formation BD signal. As a result, the corrected image data is output to the laser controller 1008 in synchronization with the image formation BD signal.

The CPU 151 determines whether or not the image data corresponding to one surface (corresponding to one page) of the recording medium is output (Step S308), and when the image data corresponding to one page is not output (Step S308: N), repeatedly executes the processing from Step S305 to Step S307 again. When the image data corresponding to one page is output (Step S308: Y), the CPU 151 determines whether or not the print job is finished (Step S309), and when the print job is not finished (Step S309: N), executes Step S302 again. When the print job is finished (Step S309: Y), the CPU 151 ends the processing.

As described above, according to at least one embodiment, it is possible to determine a reflection face with high accuracy. In at least one embodiment, the face identification unit 1009a determines a face number based on the time period in which the image formation BD signal is at "L", but the present disclosure is not limited thereto. For example, the face identification unit 1009a may determine the face number based on the time period in which the image formation BD signal is at "H".

At least one embodiment has been described by taking the monochrome electrophotographic copying machine as an example, but the configurations of at least one embodiment can also be applied to a color electrophotographic copying machine.

In at least one embodiment, the engine controller 1009 starts counting of the number of pulses of the output image formation BD signal when the output of the image formation BD signal is started, but the present disclosure is not limited thereto. For example, the engine controller 1009 may be configured to start counting of the number of pulses of the output image formation BD signal when the output of the image data from the image controller 1007 to the laser controller 1008 is started.

The laser light source 1000, the polygon mirror 1002, the photosensitive drum 708, the BD sensor 1004, and the engine controller 1009 in at least one embodiment are included in an image forming unit.

In at least one embodiment, the image controller 1007 outputs the corrected image data to the laser controller 1008, but the present disclosure is not limited thereto. For example, the image controller 1007 may be configured to output the corrected image data to the engine controller 1009, and the engine controller 1009 may be configured to output the image data to the laser controller 1008. That is, it is only required that the image controller 1007 be configured to output the corrected image data to the image forming unit.

In at least one embodiment, the sheet sensor 726 is arranged on the upstream side of the transfer position and on the downstream side of the registration rollers 723, but the present disclosure is not limited thereto. For example, the sheet sensor 726 may be arranged on the upstream side of the registration rollers 723. As described above with reference to FIG. 4A, FIG. 4B, and FIG. 5, a face number is identified based on the cycle of the BD signal, but a method of identifying a face number is not limited thereto. For example, a face number may be identified based on a phase difference between a signal indicating the rotation cycle of the motor configured to rotationally drive the polygon mirror (for example, a signal of an encoder or an FG signal) and the BD signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-168253, filed Sep. 7, 2018, which is hereby incorporated by reference herein in its entirety.

What is claimed is:

1. An information processing apparatus, which is connected to an image forming apparatus including an image forming unit, the image forming unit including:

a first receiving unit configured to receive image data;

a light source configured to output light based on the image data received by the first receiving unit;

a photosensitive member;

a rotary polygon mirror, which has a plurality of reflection faces, and is configured to rotate to deflect the light output from the light source through use of the plurality of reflection faces, to thereby scan the photosensitive member;

a light receiving unit configured to receive the light deflected by the rotary polygon mirror;

an identification unit configured to identify a reflection face that is used for scanning of the photosensitive member from among the plurality of reflection faces based on a result of the receiving of the light by the light receiving unit; and a generation unit configured to generate a predetermined signal including a signal having a first level and a signal having a second level, wherein the generation unit is configured to generate the predetermined signal based on information related to the reflection face identified by the identification unit such that a length of a first period differs from a length of a second period, the first period being a period in which the predetermined signal corresponding to a specific reflection face from among the plurality of reflection faces is at the first level, and the second period being a period in which the predetermined signal corresponding to a reflection face other than the specific reflection face is at the first level, the information processing apparatus comprising:
- a second receiving unit configured to receive the predetermined signal;
- a first detector configured to detect a first change, in which a level of the predetermined signal received by the second receiving unit is changed from the second level to the first level;
- a second detector configured to detect a second change, in which the level of the predetermined signal received by the second receiving unit is changed from the first level to the second level;
- a determination unit configured to determine whether the first change is a change corresponding to the specific reflection face based on a detection result of both of the first detector and the second detector, wherein the determination unit updates, in a period from a first timing to a second timing, face information indicating one of the plurality of reflection faces each time the first change is detected by the first detector, the first timing being a timing at which the first change is determined to be the change corresponding to the specific reflection face, and the second timing is a timing at which the first change is determined, first after the first timing, to be the change corresponding to the specific reflection face;
- a correcting unit configured to correct, based on the face information, image data corresponding to a scanning line of the light, through use of correction data corresponding to the reflection face corresponding to the scanning line; and
- an output unit configured to output the corrected image data to the image forming unit in response to the first detector detecting the first change, wherein, in a case where the number of the first change detected by the first detector during a period from the first timing to the second timing exceeds the number corresponding to the number of the reflection faces of the rotary polygon mirror, the determination unit does not update the face information.

2. The information processing apparatus according to claim 1,
wherein the rotary polygon mirror includes n (n is an integer greater than or equal to 3) reflection faces, and
wherein the determination unit does not update the face information in a case where the number of detections of the first change by the first detector exceeds n−1 during the period from the first timing to the second timing.

3. The information processing apparatus according to claim 1,
wherein each of the plurality of reflection faces of the rotary polygon mirror has a face number as the face information assigned thereto in order of being scanned by the light,
wherein the information processing apparatus further comprises a memory configured to store the face number, and
wherein the determination unit is configured to store the face number in the memory each time the reflection face is determined, and is configured to update the face number each time the first change is detected by the first detector.

4. The information processing apparatus according to claim 1,
wherein the length of the first period is longer than the length of the second period, and
wherein the determination unit is configured to determine that the first change is the change corresponding to the specific reflection face in a case where a time period from a first timing at which the first change is detected to a second timing at which the second change is detected is longer than a predetermined time period, the predetermined time period is shorter than the length of the first period and is longer than the length of the second period.

5. The information processing apparatus according to claim 1,
wherein a first circuit board on which the second receiving unit is mounted differs from a second circuit board on which the generation unit is mounted, and
wherein the first circuit board is connected to the second circuit board by a cable.

6. An image forming apparatus, comprising:
a first receiving unit configured to receive image data; and
an image forming unit configured to form an image on a recording medium based on the image data,
the image forming unit including:
- a light source configured to output light based on the image data received by the first receiving unit;
- a photosensitive member;
- a rotary polygon mirror, which has a plurality of reflection faces, and is configured to rotate to deflect the light output from the light source through use of the plurality of reflection faces, to thereby scan the photosensitive member;
- a light receiving unit configured to receive the light deflected by the rotary polygon mirror;
- an identification unit configured to identify a reflection face that is used for scanning of the photosensitive member from among the plurality of reflection faces based on a result of the receiving of the light by the light receiving unit; and
- a generation unit configured to generate a predetermined signal including a signal having a first level and a signal having a second level, wherein the generation unit is configured to generate the predetermined signal based on information related to the reflection face identified by the identification unit such that a length of a first period differs from a length of a second period, the first period being a period in which the predetermined signal corresponding to a specific reflection face from among the plurality of reflection faces is at the first level, and the second period being a period in which the predetermined signal corresponding to a reflection face other than the specific reflection face is at the first level;

the image forming apparatus further comprising:
- a second receiving unit configured to receive the predetermined signal;
- a first detector configured to detect a first change, in which a level of the predetermined signal received by the second receiving unit is changed from the second level to the first level;
- a second detector configured to detect a second change, in which the level of the predetermined signal received by the second receiving unit is changed from the first level to the second level;
- a determination unit configured to determine whether the first change is a change corresponding to the specific reflection face based on a detection result of both of the first detector and the second detector, wherein the determination unit updates, in a period from a first timing to a second timing, face information indicating one of the plurality of reflection faces each time the first change is detected by the first detector, the first timing being a timing at which the first change is determined to be the change corresponding to the specific reflection face, and the second timing is a timing at which the first change is determined, first after the first timing, to be the change corresponding to the specific reflection face;

a correcting unit configured to correct, based on the face information, image data corresponding to a scanning line of the light, through use of correction data corresponding to the reflection face corresponding to the scanning line; and an output unit configured to output the corrected image data to the image forming unit in response to the first detector detecting the first change, wherein, in a case where the number of the first change detected by the first detector during a period from the first timing to the second timing exceeds the number corresponding to the number of the reflection faces of the rotary polygon mirror, the determination unit does not update the face information.

* * * * *